Jan. 5, 1943.　　　A. H. R. FEDDEN　　　2,307,578
VARIABLE-PITCH AIRSCREW
Filed April 3, 1939　　　8 Sheets-Sheet 5
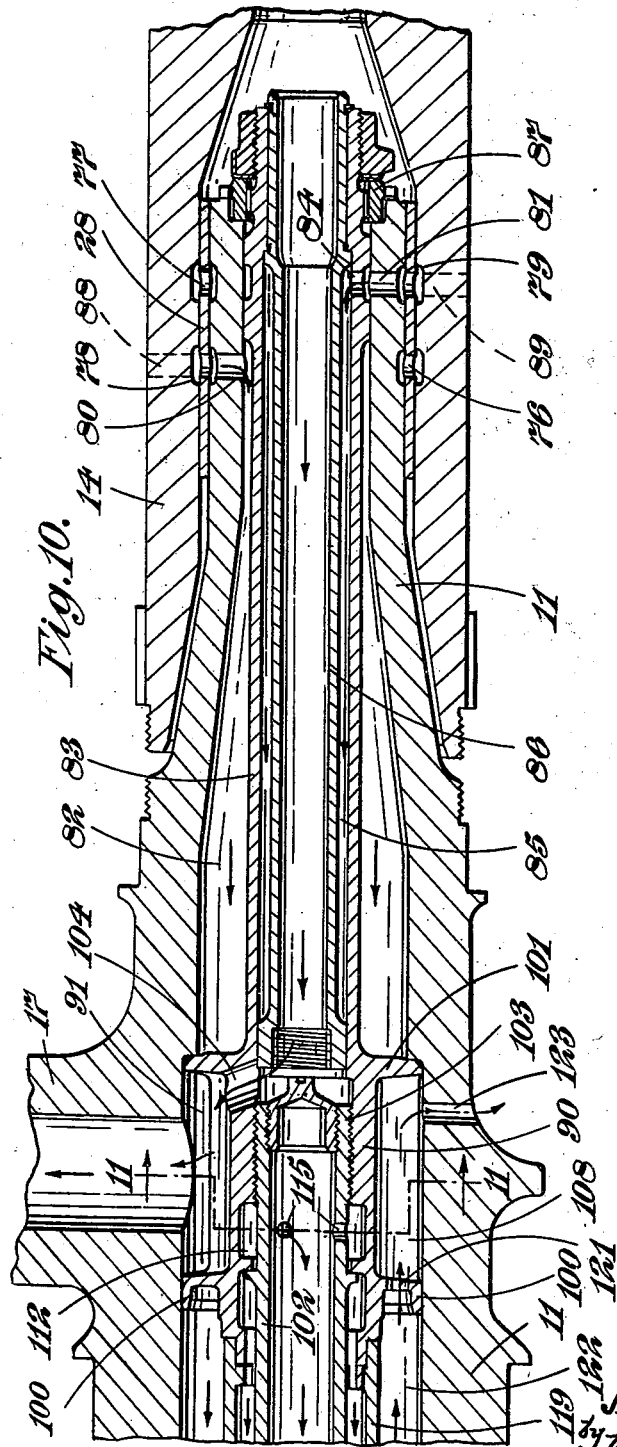
Inventor
Alfred H. R. Fedden
by Wilkinson & Mawhinney
Attorneys.

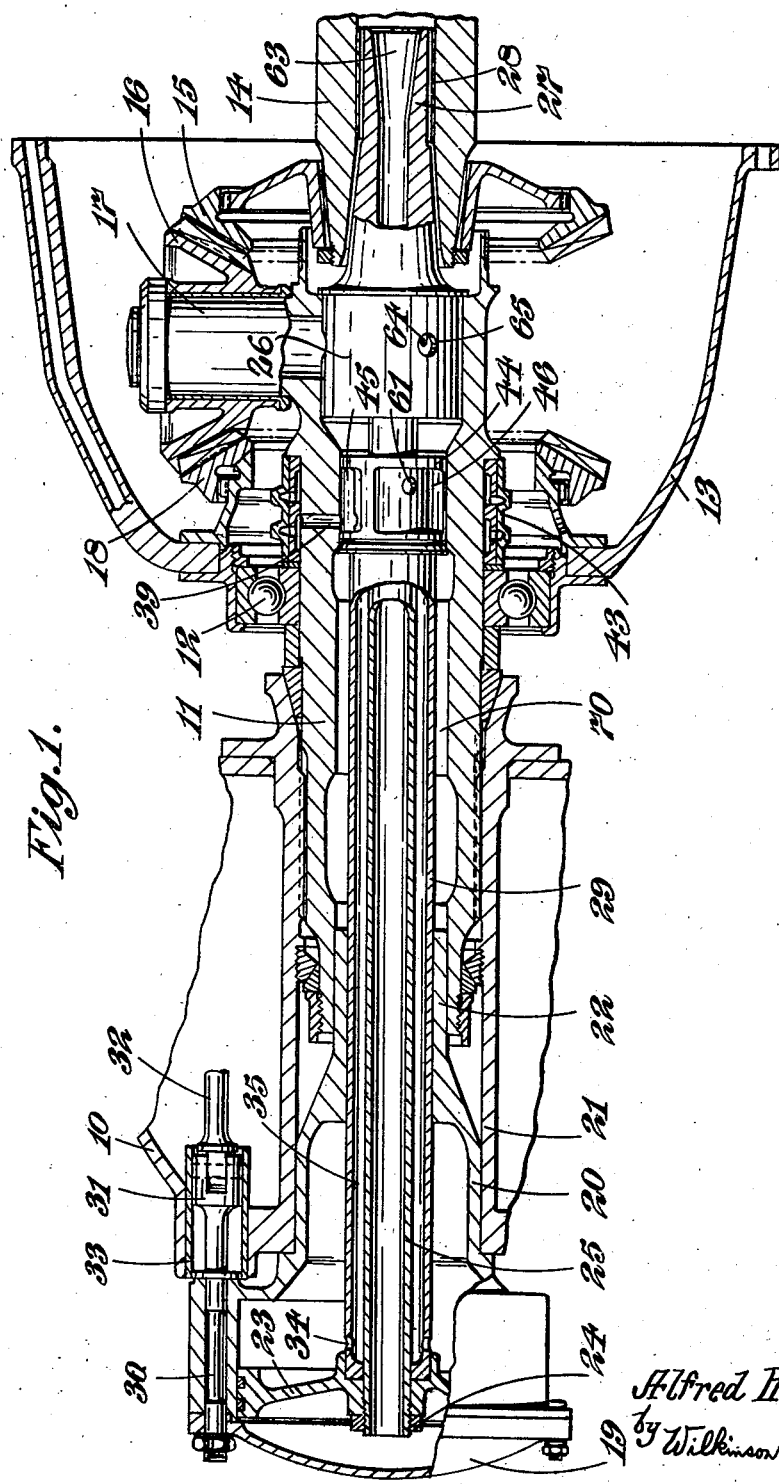

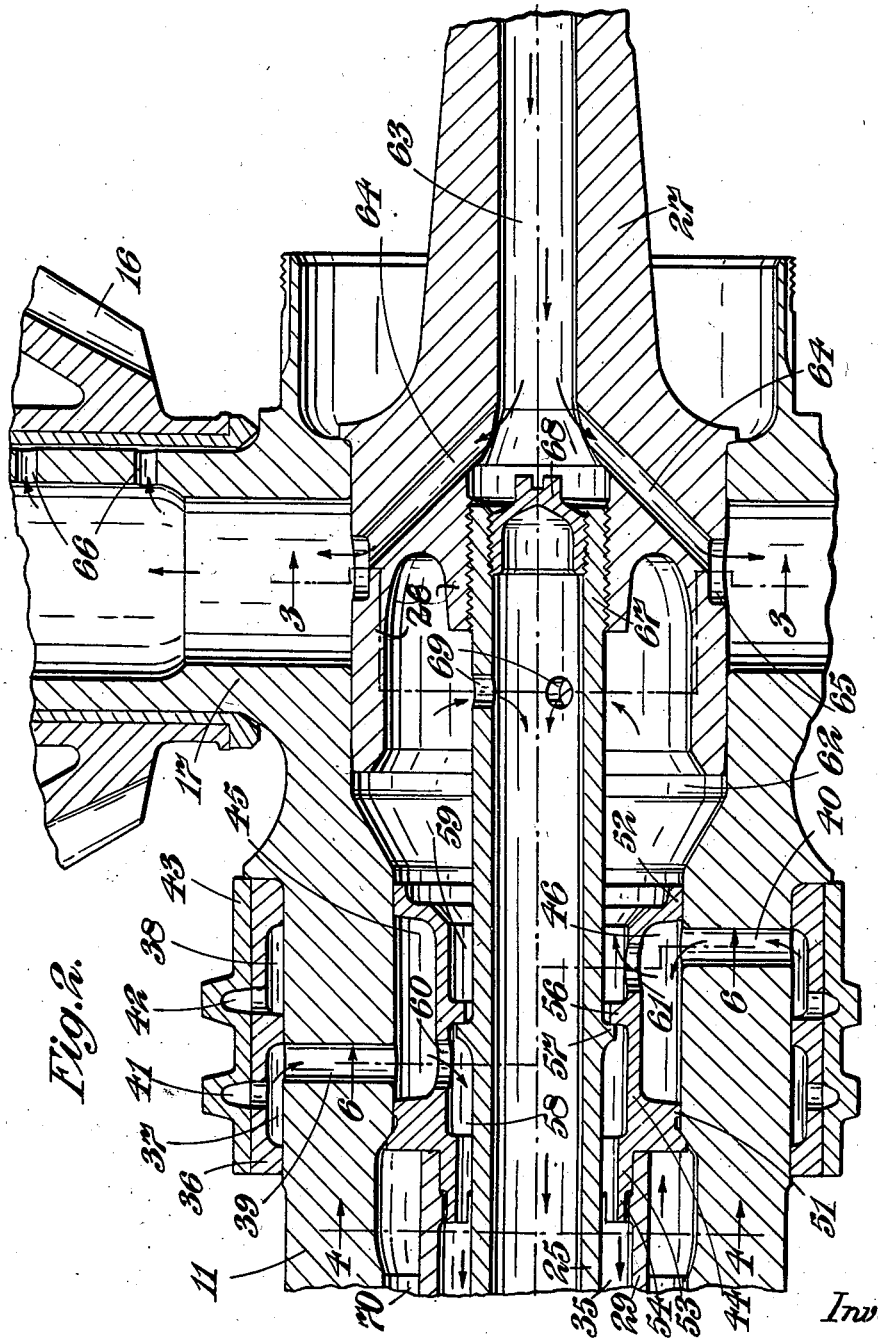

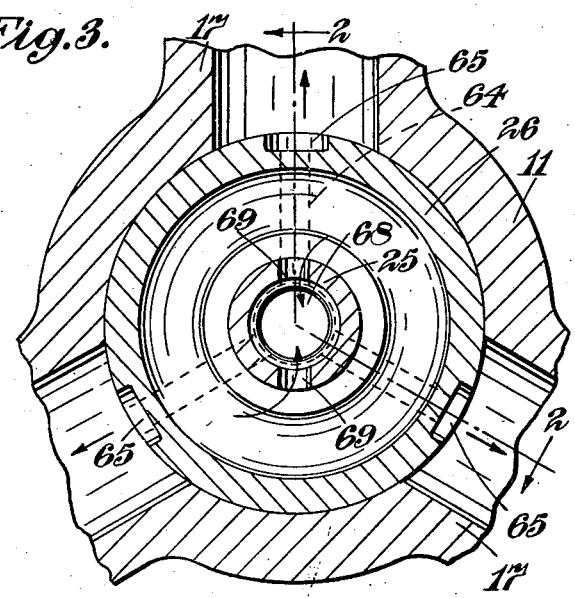
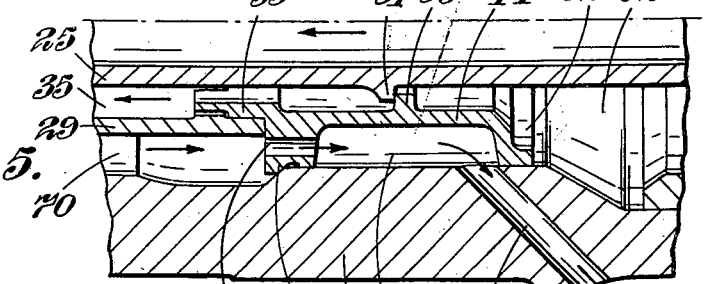
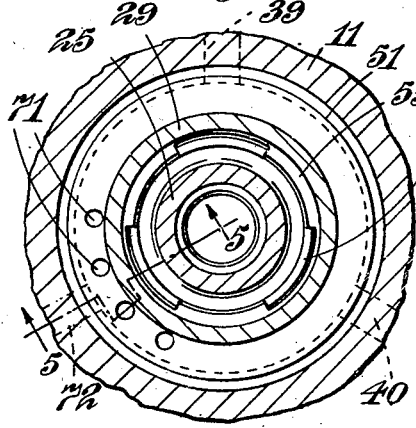
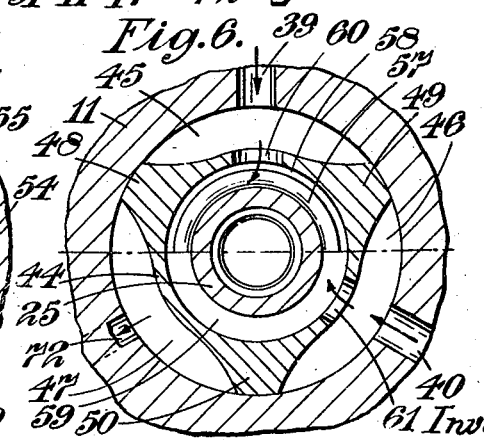

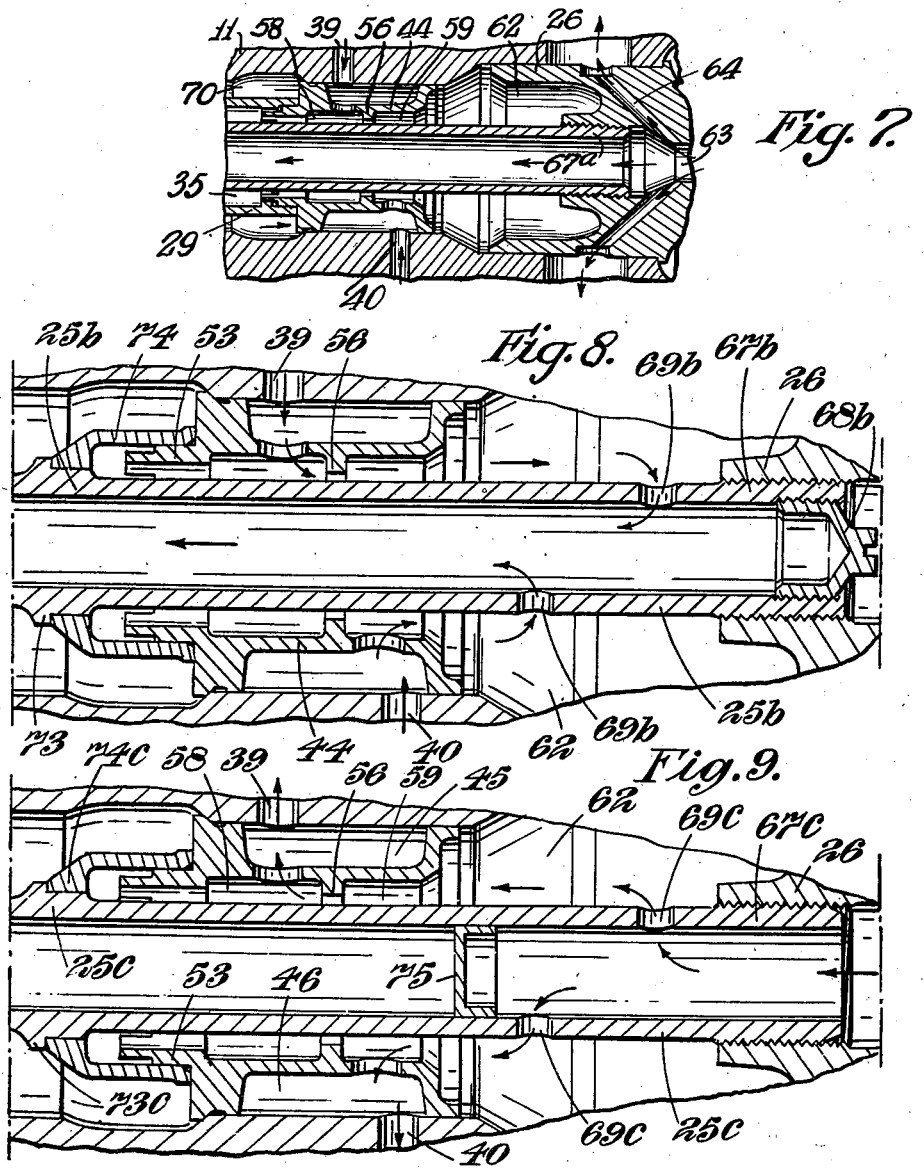

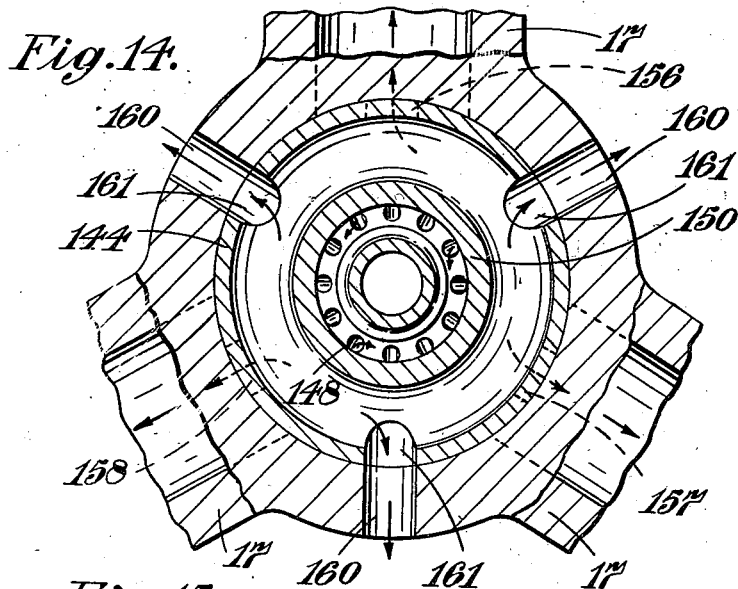
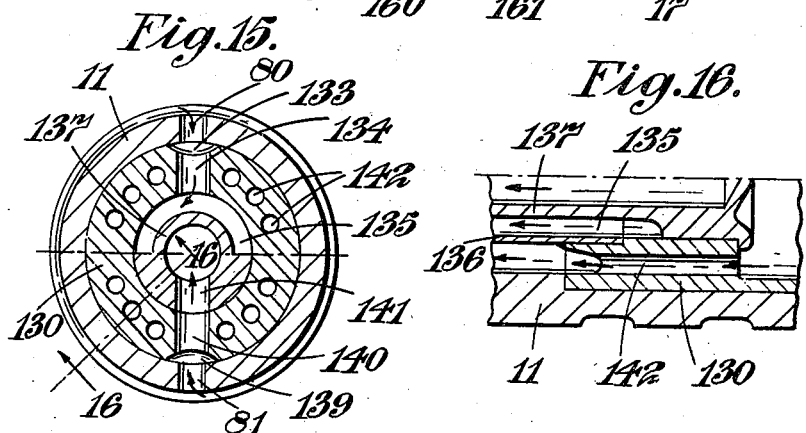
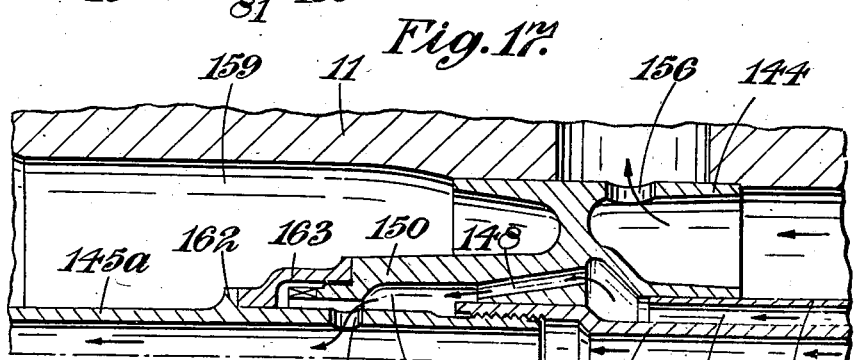

Patented Jan. 5, 1943

2,307,578

UNITED STATES PATENT OFFICE 2,307,578

VARIABLE-PITCH AIRSCREW

Alfred Hubert Roy Fedden, Bristol, England, assignor to The Bristol Aeroplane Company Limited, Bristol, England, a British company Application April 3, 1939, Serial No. 265,847
In Great Britain May 5, 1938

4 Claims. (Cl. 170—135.6)

This invention relates to fluid-transmission circuits, such as are provided in variable-pitch air-screws for aircraft. One object of the invention is to provide separate paths for two fluids whereby one fluid can flow from outside an outer tube to the interior of an inner tube, or vice versa and another fluid can flow simultaneously along the space between the two tubes. A further object of the invention is to enable one type of variable-pitch airscrew to be replaced by an airscrew of a different type with a minimum of alteration to the fluid-circuits between the airscrew and the engine. A further object is to enable a hydraulic variable-pitch airscrew to be applied in a convenient manner to an internal-combustion installation of the kind in which the airscrew-shaft is driven through change-speed gearing from the engine-shaft.

According to one feature of the invention a fluid-transmission joint comprises two tubes, one within the other, a bush, flange or the like separating the two tubes, one or more conduits running endwise through the bush to connect the space between the tubes on one side of the bush with a space on the other side of the bush, and one or more conduits passing radially through the bush to connect the interior of the inner tube with the exterior of the outer tube.

As applied to a variable-pitch airscrew installation, the transmission joint may be used for conveying pressure liquid and lubricating oil to the various points where they are required.

According to another feature of the invention, a variable-pitch airscrew installation comprises a hollow airscrew-shaft ported at its rear end for the admission of two separate flows of liquid, one outside and the other inside a rear tube within the shaft, a boss carried by or engaging the forward end of the said rear tube and engaging the internal wall of the shaft, two chambers within the boss and a conduit leading through the boss from inside the tube to one said chamber and a conduit leading through the boss from outside the tube to the other said chamber. The said chambers are preferably spaced apart endwise of the boss and are constituted by spaces between the boss and an inner tube extending forwardly from the boss, the inner tube being perforated to admit liquid from one said chamber to the interior of the inner tube, the other chamber opening into the space surrounding the inner tube. According to another feature of the invention, the airscrew-shaft, instead of being ported at the rear end for the admission of the liquid is ported at a point in its length between the front end and gearing by which the airscrew is driven from the engine shaft at a reduced speed.

According to another feature of the invention, the two chambers aforesaid are separated from one another by a partition which comprises an external flange on the inner tube engaging an internal flange on the bush or boss, which internal flange has a minimum diameter greater than the external diameter of the inner tube so that when the said inner tube is replaced by an unflanged tube of the same diameter the two chambers both communicate with the inter-tube space and with a space at the rear end of the bush.

Other features of the invention will appear hereinafter.

Various specific embodiments of the invention will now be described, by way of example, with reference to the accompanying drawings, of which Figure 1 is a section of a hydraulically-actuated airscrew-hub and associated parts, Figure 2 is a sectional view of the hydraulic circuit, being a section on the line 2—2 of Figure 3, Figure 3 is a section on the line 3—3 of Figure 2, Figure 4 is a section on the line 4—4 of Figure 2, Figure 5 is a section on the line 5—5 of Figure 4, Figure 6 is a section on the line 6—6 of Figure 2, Figure 7 is a view, corresponding to Figure 2, in which the oil-circuits have been modified for use with a different type of airscrew, Figure 8 shows a further modification, for a further type of airscrew, Figure 9 shows yet another modification, Figure 10 is a sectional view of an alternative form of the invention, being a section on the line 10—10 of Figure 11.

Figure 11:
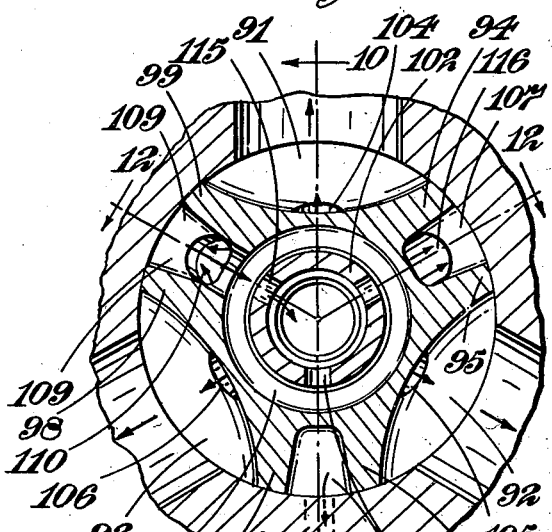
Figure 11 is a section on the line 11—11 of Figure 10.

Figures 13 to 16 show a construction alternative to that described above with reference to Figures 10, 11 and 12, Figure 13 being a longitudinal section, Figure 14 a section on the line 14—14 of Figure 13, Figure 15 a section on the line 15—15 of Figure 13, and Figure 16 a section on the line 16—16 of Figure 15.

Fig. 17 is a detail view, in section, showing a modification of the invention adapted for use with a pitch changing motor which utilizes only one supply of liquid under pressure.

One form of fully-hydraulical mechanism is shown in Figure 1 in which the airscrew-hub 10 (which is formed with sockets, not shown, to receive the roots of the airscrew-blades) is splined to the airscrew-shaft 11 which is supported in a thrust-bearing 12 at the forward end of a gear casing 13, the casing 13 being attached to the front cover (not shown) of the crank-case of a radial-cylinder internal-combustion engine.

The casing 13 contains gearing by which the airscrew shaft is driven. The crank-shaft 14 of the engine carries a gear 15 engaging pinions 16, of which there may be three symmetrically disposed, each pinion being borne on a stub-axle 17 formed integrally with the airscrew-shaft 11. On the inside of the front end of the gear casing 13 a stationary gear 18 is carried which also meshes with the pinions 16. Thus, the shaft 11 is driven at a suitably reduced speed (in this case, at half speed) with respect to the crank-shaft 14 of the engine.

The airscrew-hub 10 carries at its front end a hydraulic cylinder 19 the rear wall of which is extended to form a tubular portion 20 which slides in a sleeve-portion 21 of the hub and a further reduced portion 22 which slides in the forward end of the airscrew-shaft 11. Co-operating with the cylinder 19 is a piston 23 which is secured by a nut 24 to a tube 25 the rear end of which is secured, in a manner explained hereinafter, to a centre-piece 26 carried by a tail-shaft 27 which is received in the forward end of the crank-shaft 14, being separated therefrom by a bush 28. A rear bearing (not shown) may be provided between the airscrew-shaft and the gear 15.

Concentrically surrounding the tube 25 is an outer tube 29 which makes sliding engagement with the internal surface of the tubular portion 22 of the cylinder cover so that the portion 22 engages internally with the tube 29 and externally with the airscrew-shaft 11. At its rear end the tube 29 is locked against rotation by means described hereinafter and restrained against rearward movement so that the piston 23 is clamped between the front end of the tube 29 and the nut 24 whereby it is immovable longitudinally with respect to the airscrew-shaft.

In the type of airscrew shown in Figure 1 the pitch of the blades is adjustable in one direction by admitting oil under pressure to the interior of the tube 25 from which it passes to the front chamber of the cylinder 19 whereby the cylinder moves forwardly. Such forward movement is transmitted by bolts 30, cross-heads 31 and drag-links 32 to the roots of the airscrew-blades in known manner, each cross-head 31 being guided in a suitable sleeve 33. During the forward movement of the cylinder, oil is discharged from the rear chamber through ports 34 into the inter-tube space 35. When the blade-pitch is to be adjusted in the other direction, oil under pressure is admitted to the space 35 whereby the cylinder is moved rearwardly and oil from the front chamber is discharged along the tube 25.

It will be understood that the oil under pressure for actuating the pitch-varying motor 19, 23, has to be admitted to the interior of the shaft 11 from an external stationary part. In the form of the invention described with reference to Figures 1 to 9, this pressure oil is fed into the shaft at a point in its length between the front end of the gear-casing 13 and the gearing 15, 16, 18. In the arrangements of Figures 10 to 17 the pressure oil is admitted at a point to the rear of the gearing. A suitable governor unit, comprising a speed governor, a relay valve and a booster pump, is mounted on the front cover of the engine casing. The particular form of governor unit depends upon the type of airscrew fitted. With the type of airscrew shown in Figure 1 the booster pump delivers liquid, such as oil, at two different pressures both in excess of the pressure of the engine-lubrication system. One supply is fed to the tube 25 and the other to the space 35. In addition to the pressure oil required to actuate the hydraulic motor 19, 23, oil at the pressure of the engine-lubricating system is required for lubricating the gearing 15, 16, 18 and, in some cases, lubricating oil at a comparatively low pressure is required for the pitch-varying motor in addition to the hydraulic oil. Also, in some cases, a path has to be provided for oil which leaks from the working parts of the hydraulic motor and has to be returned to a point within the casing 13.

As shown first in Figures 2 to 6, the airscrew-shaft 11, which is identical with that shown in Figure 1 is surrounded by a ported bush 36 (see also Figure 1) having internal grooves 37, 38, which communicate respectively with radial conduits 39, 40 in the shaft and with grooves 41, 42 formed in a surrounding sleeve 43. The grooves 41, 42 are connected by pipes, not shown, to the booster pump of the governor unit referred to. By operation of a suitable valve, oil at one pressure may be supplied to the groove 41 for adjusting the blade-pitch in one direction or at another pressure to the groove 42 for adjusting the pitch in the opposite direction. Both pressures are substantially in excess of the ordinary lubricating-oil pressure of the engine.

Within the airscrew-shaft 11 at the region of the sleeve 43 is a bush 44 which, as shown in Figures 2 and 6, is formed around its periphery with three grooves 45, 46, 47, each of wide circumferential extent. The bush thus engages the bore of the shaft by three intermediate lands 48, 49, 50, running longitudinally of the shaft and by a disc-like or flange-like portion 51, 52, at each end.

The bush 44 is formed integrally with a forwardly extending tubular portion 53 which is cut with splines 54 to engage co-operating splines 55 formed on the internal wall of the tube 29 (Figure 4). As shown in Figure 2, the tube 29 overlaps the unsplined portion of the tubular extension 53 so as to make a fluid-tight joint. Also the tubular portion 53 is spaced away from the inner tube 25 so as to provide a passage for oil between these parts. The inner wall of the bush 44 is integrally formed with an inwardly-directed flange 56, of larger minimum diameter than the diameter of the tube 25, against which an external flange 57 on the tube 25 abuts so as to make a fluid-tight joint at this point. The flanges 56, 57 divide the space between the bush 44 and the tube 25 into two annular chambers 58, 59. The chamber 58 communicates through a port 60 with the groove 45 and through the interior of the portion 53 with the space 35; the chamber 59 communicates through a port 61 with the large space 62 in rear of the bush.

The tail-shaft 27 fits into the rear end of the airscrew-shaft 11, engaging it by the centre-piece 26. The bore 63 of the shaft 27 receives lubricating oil from the interior of the crank-shaft 14 (Figure 1) and this oil passes by one of three oblique conduits 64 and ports 65 into the interior of each of the stub-axles 17. The bearing between each pinion 16 and its stub-axle is lubricated by oil which flows through radial ports 66.

The tube 25 is screw-threaded at its rear end 67 into the centre piece 26, and the bore of the tube, in the particular form of airscrew now being described, is closed by a plug 68. The tube 25 is formed with a plurality of ports 69 through which oil from the chamber 62 can flow into the interior of the tube.

The space 70 (see also Figure 1) between the tube 29 and the shaft 11, communicates with the groove 47 in the bush 44 through a plurality of holes 71, drilled in the flange 51 (Figures 4 and 5). From this groove oil can pass through an oblique conduit 72 which opens into the interior of the gear casing 13.

From the above description it will be understood that oil under pressure for moving the cylinder 19 forwardly enters the groove 42 in the sleeve 43 and passes by way of the groove 38 in the bush 36 through the conduit 40 into the groove 46 in the bush 44. From this space the oil flows through the port 61 into the chamber 59 which opens into the large space 62. From this chamber the oil flows through the ports 69 into the interior of the tube 25 from the forward end of which it is discharged into the front end of the cylinder 19.

Oil under pressure for moving the cylinder 19 rearwardly is admitted to the groove 41 in the sleeve 43 and flows by way of the groove 37, conduit 39, groove 45, port 60, chamber 58, through the interior of the tubular portion 53 into the space 35 from which it is discharged at the front end of the tube 29 through ports 34.

Any oil which leaks from the rear end of the cylinder into the space 70 flows through the holes 71 into the groove 47 along the conduit 72 into the interior of the gear casing 13 from which it is drained back to the engine sump.

The parts described with reference to Figures 2 to 6 may readily be applied to that type of airscrew in which only one path is required between the pump and the pitch-varying motor for oil under pressure, an additional path being required for oil at the pressure of the engine lubricating-oil system. To make the necessary conversion, the governor unit is replaced by the unit appropriate to the type of airscrew to be fitted and the tube 25 is unscrewed from the centre-piece 26 and removed. As shown in Figure 7 the tube is replaced by a tube 25a which differs from the tube 25 in that it has no external flange 57 and is not formed with ports 69. Also, the end is not plugged but is left open to communicate with the bore 63 and the tail-shaft 27. The minimum diameter of the internal flange 56 on the bush 44 is greater than the external diameter of the tube 25a so that, as can be seen from Figure 7, the two chambers 58 and 59 within the bush 44 communicate with one another by reason of the absence of any flange on the tube 25a. Thus, oil from both conduits 39 and 40 can flow as shown by the arrows into the space 35 which, at the forward end of the airscrew-shaft, opens into the cylinder of a hydraulic motor of the kind which is moved in one direction by liquid under a pressure in excess of engine pressure but in the other direction by oil at engine pressure. Oil at engine pressure from the shaft 27 flows along the interior of the tube 25a as shown by the arrows. Leakage from the hydraulic mechanism is returned along the space 70 into the intake of the casing 13 in exactly the same manner as has already been described with reference to Figures 2 to 6.

Where no supply of oil at the pressure of the engine-lubricating system is required, but only a single supply of oil at a somewhat higher pressure, the installation may be converted in the manner shown in Figure 8 in which, instead of the tube 25a a tube 25b is inserted, being screwed at its rear end 67b into the centre-piece 26 and plugged as shown at 68b. At a point in front of the bush 44 the tube 25b is formed with a flange 73 which is engaged by a cap 74 which fits the unsplined outer wall of the tubular portion 53 of the bush in the same manner as the tube 29 in Figure 2. The cap 74 thus closes the chambers 58, 59 at the front end of the bush. The rear end, however, is open to the space 62 from which oil can flow through ports 69b into the interior of the tube 25b. The oil may be supplied through both conduits 39 and 40, as in Figure 7, owing to the absence of any flange on the tube 25b, to co-operate with the internal flange 56 which, as has already been pointed out, is spaced away from the tube 25b. In this type of airscrew, movement of the hydraulic motor in the other direction is effected non-hydraulically; for example by a spring or by centrifugal force. It will be understood that a suitable governor unit is substituted.

Where an airscrew is installed in which there is no hydraulic pitch-varying mechanism of any kind, for example, where the mechanism is entirely electrical, the parts may be converted as shown in Figure 9 in which the inner tube is replaced by a tube 25c having a flange 73c and a cap 74c similar to the corresponding parts of Figure 8.

The rear end 67c is screwed into the centre-piece 26 but the interior of the tube is left open at its rear end to oil entering at engine-oil pressure. No oil is required at the forward end of the airscrew so that the tube 25c is plugged as shown at 75. However, between the plug and the portion 67c the tube is formed with ports 69c through which the lubricating oil flows outwardly into the chamber 62 and, as shown by the arrows, passes through the chambers 58, 59 and grooves 45, 46 into the conduits 39, 40, respectively. The purpose of providing a path for lubricating oil as shown in Figure 9 is to lubricate the rotating joint 11, 36, 43, (Figure 2) and associated parts which would otherwise run dry when a non-hydraulic system was being used. For non-hydraulic airscrews the governor unit is replaced by a blank cap.

Figure 12:
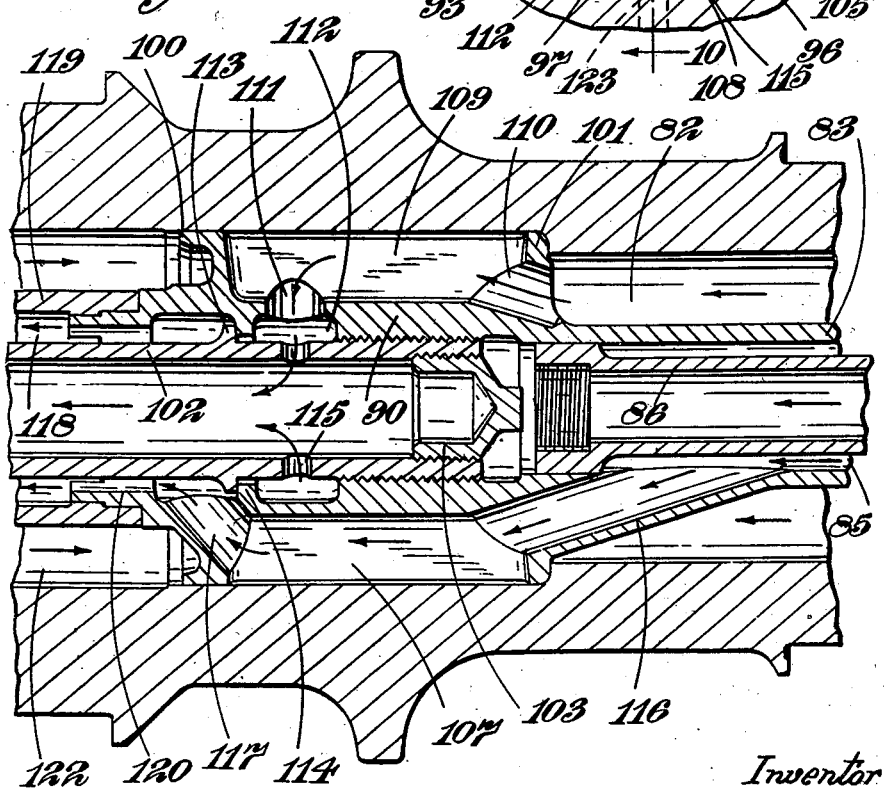
Figure 12 is a sectional plan on the line 12—12 of Figure 11, Figures 11 and 12 being drawn to a somewhat larger scale than Figure 10.
Figure 13:
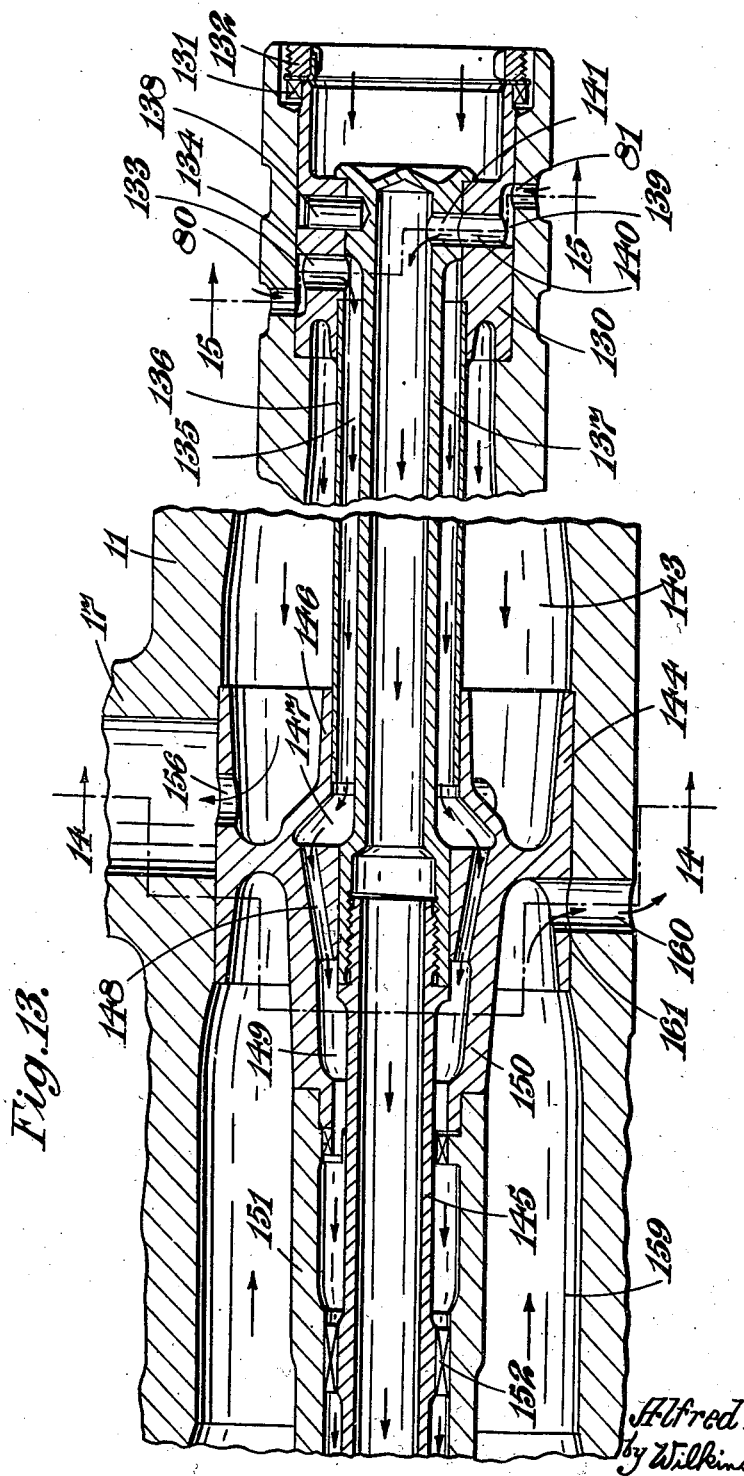

Instead of introducing the pressure-liquid at a point in the length of the airscrew-shaft between the gearing and the front of the gear casing, as described with reference to Figures 2 to 9, the pressure oil may be fed through the forward end of the crank-shaft 14 into the tail-shaft 27 as shown in Figures 10 to 12.

In this form of the invention, the tail-shaft 27 is formed integrally with the airscrew-shaft 11 and with the stub-axles 17. The shaft 27 is separated from the crank-shaft 14 by a bush 28 which, however, differs from that shown in Figure 1 in that it is formed with ports 76, 77 by which internal grooves 78, 79, respectively, in the crankshaft communicate with ports 80, 81 in the shaft 27, the port 80 opening into a space 82 between the wall of the shaft 27 and a rear tube 83 and the port 81 communicating by means of ports 84 in the rear tube 83 with a space 85 between the tube 83 and an inner rear tube 86. The two tubes 83, 86, engage each other in a fluid-tight manner at their rear ends and the tube 83 is fastened against rotation with respect to the shaft 27 by means of a suitably splined member 87.

It will be understood that the grooves 78 and 79 are respectively supplied with oil under pressure through ports 88, 89 which co-operate with the grooved bush and surrounding sleeve similar to the bush and sleeve 36, 43 of Figure 2.

At its forward end the rear tube 83 is formed integrally with a boss or bush 90 the shape of which will be explained with reference to Figures 11 and 12. The external surface of the boss is cut with three depressions 91, 92, 93, each of considerable circumferential extent (see Figure 11) and each separated from the other by intervening lands 94, 95, 96, 97, 98, 99. The ends of the depressions 91, 92, 93, are closed by flange-like or disc-like ends 100, 101 (see also Figure 10).

The internal wall of the bush 19 is engaged by the screw-threaded end of an inner tube 102 which travels forwardly to the hydraulic motor of the airscrew-hub, being closed at its rear end by a plug 103. Between the plug 103 and the forward end of the tube 86 the wall of the boss is formed with an oblique port 104 (see Figure 10) through which oil can flow from within the tube 86 into the depression 91. From this depression lubricating oil flows into the interior of the stub-axle 17 to lubricate the bearing for the pinion 16. In like manner oil flows from within the tube 86 through oblique ports 105, 106 into the depressions 92, 93, whereby the other two pinions of the epicyclic gear are similarly lubricated.

Between each pair of lands 94, 95, etc., is a longitudinal groove 107, 108, 109, the function of each of which will now be described. The groove 109 is bounded at its forward end by the flange 100 but at its rear end communicates through an oblique conduit 110 (Figure 12) in the flange 101 with the space 82 between the shaft 11 and the tube 83. Near the forward end of the groove 109 the boss 90 is formed with a port 111 which leads to a chamber constituted by an internal groove 112 the front end of which is closed by the co-operation of a flange 113 on the tube 102 with an internal flange 114 on the boss 90; the flange 114, as shown, is spaced away from the surface of the tube 102 in the same fashion as the flange 56 of Figure 2. The groove 112 communicates through ports 115 with the interior of the tube 102.

The rear tube 83 is formed integrally at the rear face of the boss with a branch-pipe 116 which opens rearwardly into the space 85 between the tubes 83 and 86 and forwardly into the groove 107. The boss is also formed at the front with a short oblique passage 117 which places the groove 107 in communication with the space 118 between the tube 102 and an outer tube 119. The tube 119 may engage a forward extension 120 from the boss 90, these parts being exactly similar in this respect to the tube 29 and the portion 53 of Figure 2.

As shown in Figures 10 and 11, the groove 108 between the lands 96 and 97 communicates at its front end through one or more holes 121 with the space 122 between the outer tube 119 and the shaft 11. At its rear end the groove 108 is closed by the flange 101 but oil is discharged from it through a port 123 formed in the wall of the shaft.

The manner in which the lubricating oil from the interior of the crank-shaft is conducted to the interior of the stub-axles 17 has already been described. The three other oil paths between the exterior of the crank-shaft and the hydraulic pitch-varying motor are as follows: Pressure oil for moving the blades in one direction enters the conduit 88 in the shaft 14 from which it flows by way of the groove 78, the ports 76 in the bush 28, the ports 80 in the shaft 11, the space 82, the conduit 110, groove 109, port 111, chamber 112, ports 115 along the interior of the tube 102 as shown by the arrows in Figures 10 and 12.

Oil under pressure for moving the blades in the other direction is admitted through the conduit 89 from which it flows by way of the groove 79, the ports 81 and 84 into the space 85 between the two tubes 83 and 86 along the pipe 116, groove 107 and conduit 117 to the space 118 between the tubes 102 and 119, as shown by the arrows in Figures 11 and 12. It will be understood that when pressure oil is admitted to either of the above circuits oil from the other end of the hydraulic cylinder is discharged along the other circuit.

Oil which leaks from the hydraulic motor in the manner already explained with reference to Figures 1 and 2 passes from the space 122 through the holes 121 into the groove 108, as shown by the arrows in Figure 10, and is discharged into the interior of the gear casing 13 through the port 123.

The installation described with reference to Figures 10, 11 and 12 may be converted for use with the three other types of airscrew in the same manner as has already been described with reference to Figures 7, 8 and 9, respectively.

In the form of the invention described with reference to Figures 13 to 16 the airscrew-shaft 11 is telescoped into the crank-shaft as described with reference to Figure 10. Also the shaft is formed with ports 80, 81 to which liquid at different pressures is admitted through a ported bush similar to the bush 28 of Figure 10 which communicates with ports similar to the ports 88, 89, of Figure 10.

At its rear end the airscrew-shaft 11 receives a bush 130 which is locked against rotation by suitable splines 131 and against endwise movement by a nut 132. The bush is formed with a depression 133 which registers with the port 80 and which communicates by a radial port 134 with the space 135 between a rear tube 136 and an inner rear tube 137. The tube 137 is locked against movement with respect to the bush by means of a dowel 138. Diametrically opposite the depression 133 but displaced rearwardly with respect to it is a similar depression 139 which registers with the port 81 and communicates by a radial port 140 in the bush and a radial port 141 in the enlarged end of the tube 137 with the interior of the tube 137.

The bush 130 is also drilled from end to end with a plurality of holes 142 lying out of register with the radial ports 134, 140, as shown in Figures 15 and 16. The holes 142 provide a passageway for lubricating oil from the interior of the engine-shaft 14, through the bush, into the space 143 between the rear tube 136 and the wall of the airscrew-shaft 11.

At the region of the stub-axle 17 the airscrew-shaft is fitted internally with a centre-piece 144 into which the inner rear tube 137 passes, being screwed at its end to an inner tube 145 extending forwardly to the hydraulic motor in the same manner as the inner tube 102 of Figure 10. The rear tube 136 engages a sleeve-portion 146 of the centre-piece, the space 135 opening into a space 147 within the centre-piece. A plurality of holes 148 connect the space 147 with a space 149 surrounding the inner tube 145. The centre-piece is formed with a forward tubular extension 150 which is overlapped by an outer tube 151 similar to the outer tube 119 of Figure 10. The tube 151 and the extension 150 may similarly engage by splines to lock the outer tube against rotation. Lugs or feathers 152 on the inner tube 145 engage the outer tube 151 and locate the two tubes relatively to one another.

The space 143 in rear of the centre-piece 144 communicates by suitable ports 156, 157, 158, with the interiors of the stub-axles 17, whereby the airscrew-gearing is lubricated in the manner already described.

The space 159 between the outer tube 151 and the shaft 11 communicates with three symmetrically arranged drain-ports 160 by ports 161 cut in the wall of the centre-piece 144.

Assuming that the airscrew fitted to the forward end of the shaft 11 is of the kind above described with reference to Figure 1, oil at one pressure is admitted through the port 80 from which it flows along the inter-tube space 135, through the holes 148 into the space 149. From this space it flows along between the tubes 145, 151, as shown by the arrows, to the rear chamber of the hydraulic cylinder 19. Oil admitted to the port 81 flows through the radial ports 140, 141 into the interior of the inner rear tube 137, into the interior of the inner tube 145 from which it is discharged into the front chamber of the cylinder 19. Oil discharged from the front chamber 19 when the cylinder is moving rearwardly flows back through the port 81; oil discharged from the rear chamber of the cylinder, when the cylinder moves forwardly is discharged through the port 80. Lubricating oil for the gearing flows through the holes 142 so that its path thus crosses the path of the oil under pressure for the hydraulic motor. Oil which escapes from the rear end of the hydraulic cylinder into the space 70 of Figure 1 flows along to the space 159 in Figure 13 from which it escapes through the ports 160 which lie inside the gear-cover 13 (Figure 1) from which the oil is drained to the engine sump.

When the airscrew of Figure 1 is to be replaced by an airscrew of the kind in which the hydraulic motor requires only one supply of liquid under pressure, the outer tube 151 is removed and the inner tube 145 is replaced by a tube 145a, as shown in Figure 17, which has a flange 162 between which and the extension 150 of the centre-piece a cap 163 is accommodated which isolates the space 149 from the outside of the tube 145a. This tube is also formed with ports 164 whereby oil from the space 149 passes into the interior of the tube where it joins the pressure oil from within the inner rear tube 137. The two supplies of oil entering the ports 80 and 81 therefore unite in the tube 145a which leads to the hydraulic mechanism. Oil which leaks from the mechanism into the space 159 is discharged, as in Figures 13 and 14, through ports 160 and the manner in which the airscrew-gearing is lubricated is unaffected.

Where the arrangement of Figures 13 to 16 is to be applied to a non-hydraulic airscrew, the tube 145a may be plugged internally and the necessary lubrication of the rotating joint at the rear end of the airscrew-shaft may be effected by means of an oil conduit leading to the blank plate on the engine cover.

It will be seen that the invention enables the various oil-circuits to be arranged independently of one another within the airscrew-shaft and that replacement of one type of airscrew by another type can be effected with little alteration to the internal arrangement of the airscrew-shaft.

I claim:

1. In an engine-and-airscrew installation for aircraft, an airscrew gearing through which the airscrew is driven, a shaft forming a forward co-axial extension of an engine-shaft which drives it and having a hydraulic motor at or near its front end, a rotary joint at or near the rear end for admitting liquid under pressure to the interior of the shaft and a port in the wall of the shaft between the said motor and the said joint for supplying lubricant to said gearing through which the shaft is driven, a bush within the shaft at the region of the said port, a rear tube within the shaft to lead lubricating oil from the engine-shaft to the interior of the bush, the said tube being spaced away from the shaft to provide a space to which liquid is admitted from the said joint, one or more radial conduits in said bush to connect the interior of the said tube with the said port and one or more conduits extending longitudinally of the said bush to connect a space in front of the bush with the space surrounding the rear tube.

2. In an engine-and-airscrew installation for aircraft, an airscrew gearing through which the airscrew is driven, a driven shaft forming a forward coaxial extension of a driving shaft and having a hydraulic motor at or near its front end, a rotary joint at or near the rear end for admitting liquid under pressure to the interior of the driven shaft and a port in the wall of the said shaft between the said motor and the said joint for supplying lubricant to said gearing through which the driven shaft is driven, a bush within the driven shaft at the region of the said port, a rear tube within the driven shaft to lead lubricating oil from the driving shaft to the interior of the bush, the said tube being spaced away from the driven shaft to provide a space to which liquid is admitted from the said joint, one or more radial conduits in said bush to connect the interior of the said tube with the said port, one or more conduits extending longitudinally of the said bush to connect a space in front of the bush with the space surrounding the rear tube, an inner rear tube within the rear tube, means for admitting liquid at one pressure to the space surrounding the rear tube and at another pressure to the space between the tubes and means for admitting lubricant to the interior of the inner rear tube, wherein said bush is formed with independent longitudinal conduits separate from one another and from said radial conduit or conduits, for leading each supply of liquid to a separate conduit through the bush to the hydraulic motor.

3. In an engine and airscrew installation for aircraft, an airscrew gearing through which the airscrew is driven, a tubular airscrew-shaft forming a co-axial extension of an engine shaft which drives it and having a pitch-varying motor adjacent its front end, a ported bushing disposed within said tubular shaft adjacent the rear end thereof, means to admit fluid under pressure to the interior of the shaft, means to conduct some of the fluid in said shaft to said gearing through which the air screw is driven, means to conduct lubricating oil from the engine shaft to the interior of the ported bushing, and independent conduits connecting the ports in the bushing with the pitch varying motor.

4. In an engine-and-airscrew installation for aircraft, a hollow shaft, an inner tube within said shaft, an outer tube between the inner tube and said shaft, and a bush lying between the inner tube and the shaft, the external surface of said bush being provided with three recesses, each of which registers with a separate port in the shaft, one of said recesses communicating with the interior of the inner tube, a second recess communicating with the space between the inner and outer tube, and a third recess communicating through one or more holes in the end of the bush, with a space between the outer tube and the shaft.

ALFRED HUBERT ROY FEDDEN.